United States Patent
Nijim et al.

(10) Patent No.: US 9,794,603 B1
(45) Date of Patent: Oct. 17, 2017

(54) SYSTEM AND METHOD FOR INSERTING AND ASSIGNING A CHANNEL OR PROGRAM LINK PER DEVICE OR USER

(71) Applicant: Cox Communications, Inc., Atlanta, GA (US)

(72) Inventors: Yousef Wasef Nijim, Roswell, GA (US); James Alan Strothmann, Johns Creek, GA (US); Jay Paul Langa, Cumming, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 14/309,614

(22) Filed: Jun. 19, 2014

(51) Int. Cl.
*H04N 5/445* (2011.01)
*H04N 21/235* (2011.01)
*H04N 21/435* (2011.01)

(52) U.S. Cl.
CPC ..... *H04N 21/2355* (2013.01); *H04N 21/4355* (2013.01)

(58) Field of Classification Search
CPC ......... H04N 21/4358; H04N 21/42204; H04N 21/42208
USPC ........................................ 725/40, 39, 43–46
See application file for complete search history.

(56) References Cited

U.S. PATENT DOCUMENTS

| | | | |
|---|---|---|---|
| 2012/0117183 A1* | 5/2012 | Wong | H04L 63/101 709/217 |
| 2012/0303439 A1* | 11/2012 | Flitcroft et al. | 705/14.36 |
| 2012/0311640 A1* | 12/2012 | Cahnbley et al. | 725/53 |
| 2014/0150019 A1* | 5/2014 | Ma et al. | 725/34 |

* cited by examiner

*Primary Examiner* — Pankaj Kumar
*Assistant Examiner* — Sahar Baig
(74) *Attorney, Agent, or Firm* — Merchant & Gould P.C.

(57) ABSTRACT

Insertion and assignment of a link or URL per device/user is provided. A CE device may be used by the user as an interface to access video content from a plurality of service providers, content provider/owners, etc. An indication to access video content from an unmanaged CE device may be received and the device and its manufacturer/manager may be identified. An analysis may be performed based on the requested content item, user's display device, CE device, CE device manufacturer/manager, business rules/agreements etc. A URL or link may be assigned based on the analysis. The URL or link may then be sent for display on the user's viewing device along with the stream of requested video content. The CE device manufacturer/manager may not have the ability to update or erase the URL/link that is sent by the service provider.

20 Claims, 9 Drawing Sheets

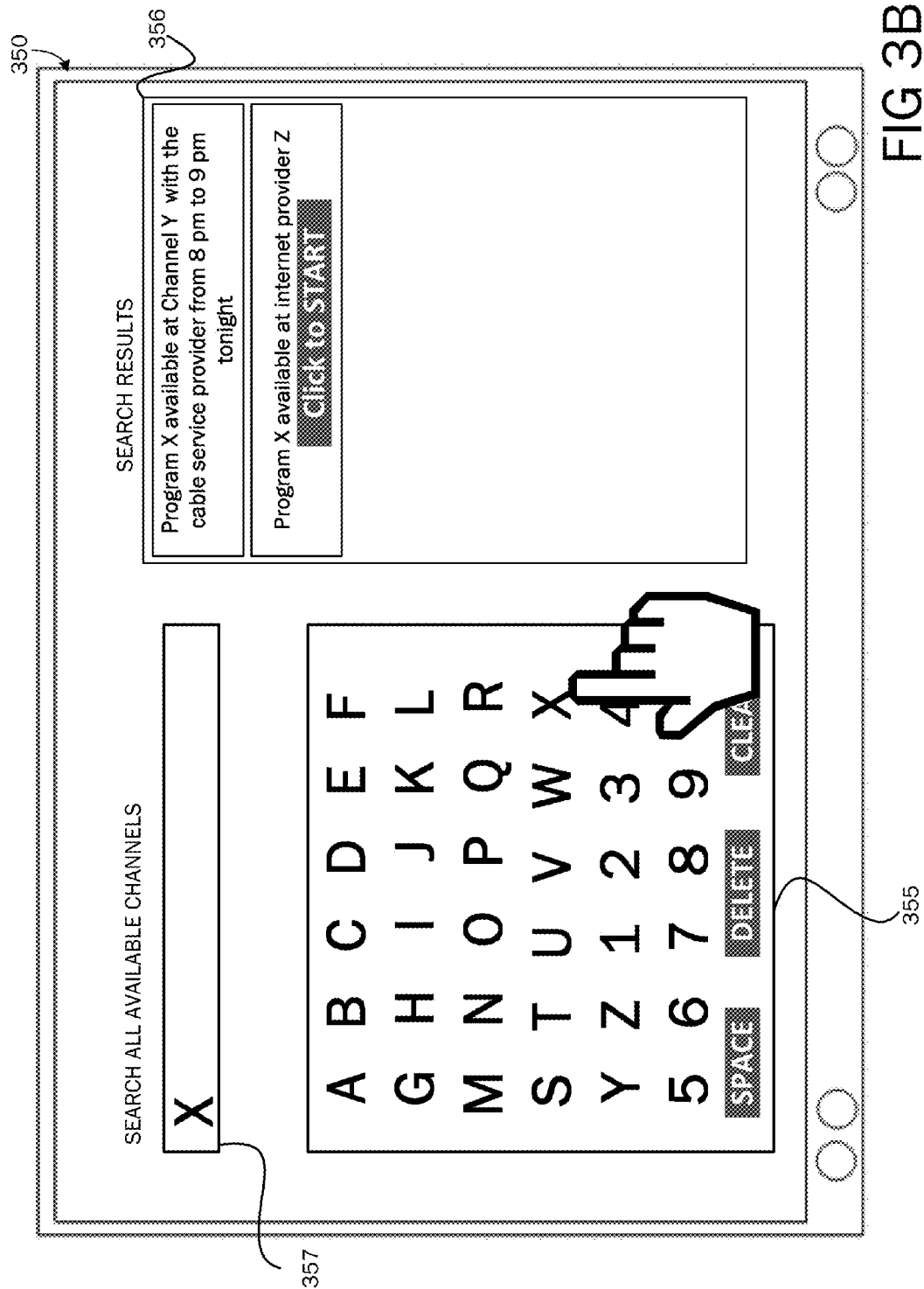

FIG 3C

SYSTEM AND METHOD FOR INSERTING AND ASSIGNING A CHANNEL OR PROGRAM LINK PER DEVICE OR USER

BACKGROUND

Video consumers today have embraced interactive television (TV) which offers a completely unique and enjoyable experience. A growing number of consumers choose to view content via streaming alternatives because they like more control over the video content. In addition, the way people use devices to access content is changing as "multi-screening," or the use of multiple screens simultaneously has become a normal operating mode for many consumers. Consumers are frequently using a second device in some capacity while watching television. This media multitasking may be great for consumers, but with people dividing their attention between screens, the pressure may be increased for advertisers, content creators, content providers etc., to create compelling and/or engaging viewing experiences that span devices and content delivery systems. Additionally, in-stream advertising holds the potential to tell advertisers whether viewers watched a given advertisement, whether they followed through on embedded calls-to-action, and so forth. Accordingly, the viewer's behavior may require taking a holistic approach to the content strategy by adjusting advertising strategies to fit the consumer's multi-screen behavior and the context of how consumers use each device.

Further, a modern user may be subscribed to a plurality of service providers. He/she may use an independent consumer electronic (CE) device to access content from all of the subscribers within one interface. This poses a concern to the service providers because they may not be able to manage and present the additional interactive content along with the requested video content items that they may wish to present to the user via various uniform resource locators (URLs) or links that may be presented for enhanced viewing experience. The CE device manufacturer/manager may possess more control over the CE device compared to the service providers which may allow the CE device managers/manufacturers to override the links or URLs sent by the service providers, content providers/owners etc.

It is with respect to these and other considerations that the present invention has been made.

SUMMARY

Embodiments of the present invention provide for insertion of a link or URL in association with a video content item based on a program level or channel level per device/user. A user may be subscribed to a plurality of service providers including cable service providers, satellite television providers, Internet channel/content providers/owners, etc. To access the content available from these service providers, the user may choose to use a consumer electronic (CE) device as a common interface. When the user selects to view a video content item via a service provider through the CE device (e.g. Apple TV®, TiVo®), the CE device and its manufacturer/manager may be identified. An analysis may be performed based on a variety of factors such as requested content item, user's display device, CE device, CE device manufacturer/manager, business rules/agreements, etc., to identify a URL, a link or a channel containing additional interactive content for display on the user's viewing device along with the stream of requested video content. The CE device manufacturer/manager may not have the ability to update or erase the URL/link that may be sent by the service provider. If desired, the CE device manufacturer/manager may be able to insert certain content in the form of URLs or links by providing them to the service providers. The service provider, in turn, may send them along with the stream of requested video content for display on the user's viewing device.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

FIG. 3B is an illustration of a user interface with which a user may search for a particular video content item available via one or more service providers, according to an embodiment.

FIG. 3C is an illustration of a hybrid user interface with video content and additional content presented simultaneously, according to an embodiment.

DETAILED DESCRIPTION

Figure 1:
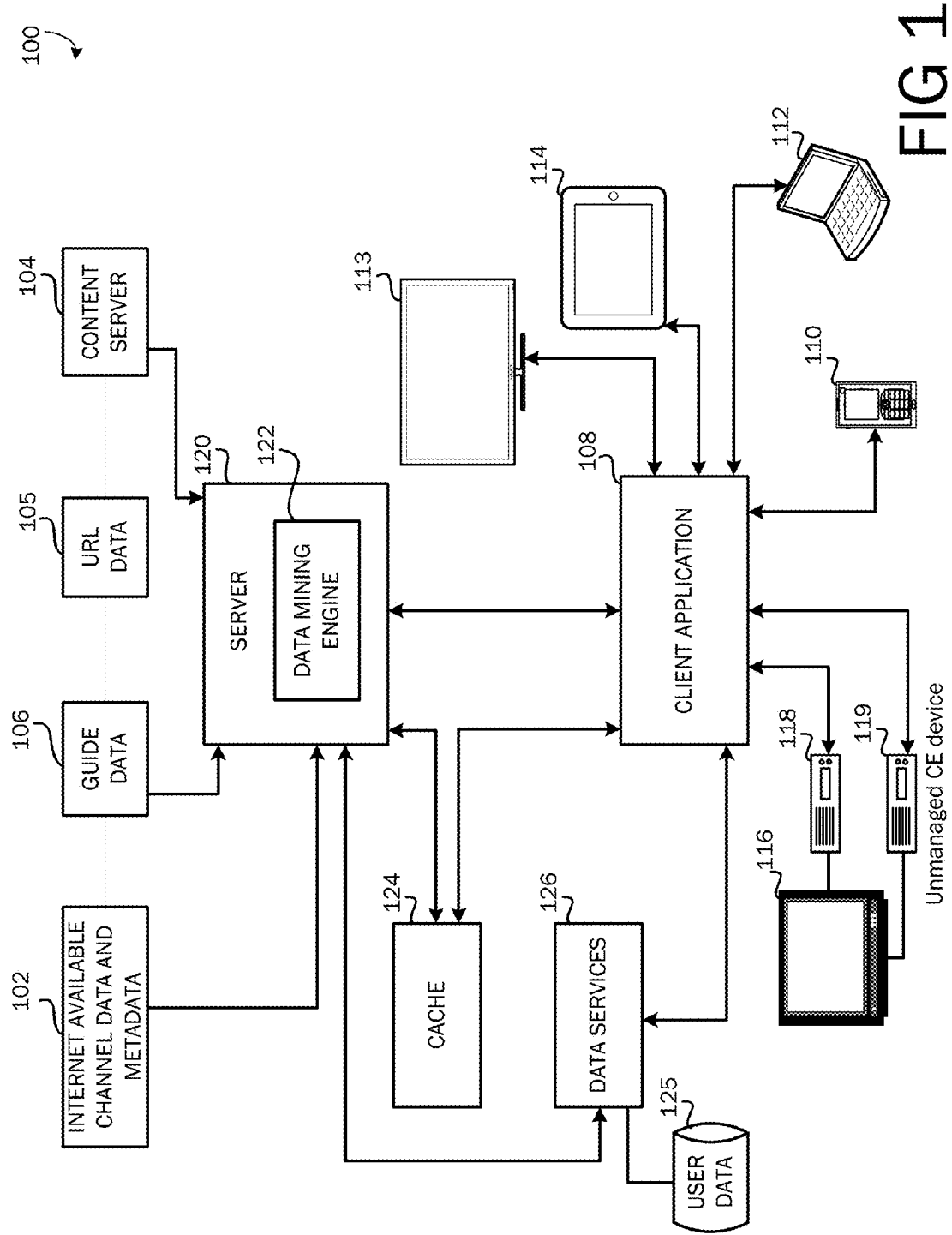
FIG. 1 is a simplified block diagram of a system for providing assignment and insertion of a link or URL in a video content item per device/user, according to an embodiment.

As briefly described above, embodiments provide for association (assignment and insertion) of a link or URL with/in a video content item per device/user. Embodiments allow service providers to provide/insert a link or URL in association with a video content metadata based on a program level or channel level per device. The device manufacturer (Consumer Electronic manufacturer—CE) may work with a service provider in order to provide/insert different links associated per program or channel.

The links or the URL could be associated with the video content item via a variety of mechanisms. The links or the URL may be inserted in the metadata, may be sent independently and/or synchronized with the video content item. The links or the URL may be sent prior to the video content item and cached on a device until the video content item is requested for play on the user's display device. Alternatively, the links or the URL may be associated with the video content item, stored in the cloud, and retrieved when desired.

Different levels of links and URLs may be provided based on the service, device, program, channel, and user. If any of the branched links is not available, then the client may fall back to a higher level of the branch. The service provider may update/edit/or delete the links or URLs from any level without affecting the other levels. The lower level will automatically become a higher level in the hierarchy.

Additionally, an inserted link or URL may be per service. For example, if the CE customer is subscribed to cable operator and over-the-top (OTT) provider (deliverer of content over the Internet without assistance from a multiple system operator (MSO) in the delivery and/or distribution), each may display different links or URLs based on the customer level of service and based on what the customer has subscribed to. This could be on a higher level link rather than deep link.

The URL provided by the service provider may be unique per CE manufacturer where each CE manufacturer could link the customer to different links or URLs including advertising. Additionally, the service provider may allow the CE device to override all or part of the association of the link to the content item (e.g., allow the CE manufacturers to enter or override a link or URL based on the metadata provided to allow for such an override). The CE manufacturers may create and insert their own links and URLs based on the service provider opening that field. The link or URL or links field may be encrypted to restrict others from use of the links or URLs.

Assigning different links or URLs per device may be developed and implemented using filtering that depends on the CE manufacturer, along with the screen size or other device attributes that will expose different levels on the links or URLs based on the device. If the device information is not available in real time, then the client application may fall back to the higher link in the hierarchy.

According to another embodiment, another communication path with the application server or the device management server may be utilized with which the customer is consuming the content. Identifying the device that the customer is using may trigger the application server to download the additional links or URLs associated with the device.

The URLs or links may be targeted per user based on the recommended content gathered by the recommendation engine or depending on the user login/access to the client. For example, if a first user is accessing the client, then the client application will send the information to the application server in order to package and send different URLs or links in association with the programs or channels that the customer may be interested in watching or learning more about using the URLs or links.

Because streaming video services like Netflix® and Hulu Plus®, when combined with CE devices like a Roku Box® or Apple TV®, and the like, can offer an increasingly attractive range of viewing options, embodiments provide for managing the assignment and insertion of links or URLs in a requested video content by the service provider for display on the user's viewing device. For example, a user may be using a third party CE device as a common interface to access services from a plurality of subscribers that the user may be subscribed to, such as, his cable/satellite service provider, Internet content providers (e.g., Netflix®, Hulu®, YouTube®) or subscribers that may be providing content via the CE device on a pay-per-view basis. Due to the use of a third party CE device by the user, the service provider may not be able to send additional interactive content, which they may typically be able to do in a managed device (e.g. a device/set-top box connected to their network).

Therefore, in an unmanaged service, such as the one in the above example, the links or URLs may be inserted within/attached to the video stream prior to being sent to the unmanaged CE device for display on user's viewing device. The system may be operable to force the embedded links or URLs to be displayed and not allow the CE device manufacturer/manager to update/remove them. As can be appreciated, if the CE device manager desires some links or URLs to be inserted within the video stream for display, CE device manager may have an agreement with a service provider.

According to an embodiment, if a user requests a content item via a specific channel on an unmanaged CE device, the service provider may be able to assign and insert a link or URL within the video stream for display on the user's display device. As can be appreciated, herein, an unmanaged device refers to a third party CE device that may be in use by the user with the ability to provide various IP channels, cable TV content, etc., that may be available through technologies such as a CableCARD.

As known by those skilled in the art, CableCARD is a special-use personal computer memory card international association (PCMCIA) card that may allow users to view and record digital cable television channels on digital video recorders, other third party devices, personal computers and television sets without the use of other equipment such as a set-top box (STB) provided by a cable services company or other similar computing device for receiving content.

According to embodiments, a link or URL to the additional content may be associated with the video content via a plurality of mechanisms. Further, the service provider may provide the video content items and additional content items in a variety of display configurations. The video content may be displayed full screen and additional information may be displayed along the bottom of the video (or other suitable location).

In a case wherein a video content item such as a television show or presentation is associated with an Internet-based website or web page dedicated to the show or presentation, the inserted link or URL may present the user with an interactive, deeper, viewing experience. The result may be a hybrid video viewing experience that may include a blend of requested video content with Internet-based or available content and services from content providers and/or content owners, such as broadcasters, online providers and CE manufacturers including digital video recording (DVR) providers, video-on-demand (VOD) providers, interactive advertising and content personalization providers, voting system providers, games and social networking, as well as, a variety of video programming-related content and services.

Embodiments of the present invention may be applied to any video decoding display device that can run an associated Internet browser as part of the user interface application layer. For example, devices may include, but are not limited to, a mobile communication device such as a mobile phone, a computing device, such as a desktop computer, a laptop computer, a wireless computing device, such as a tablet computing device, a television, such as an Internet-connected television or a television connected to a network-connected device, such as a set top box (STB).

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is a block diagram of a system 100 for providing creation of user interface modules for providing additional interactive content via dynamic link or URL insertion within video applications, as described above. Components of the system 100 may operate as a distributed system where each component is accessed via a suitable network, or the components may operate together as an integrated system. As illustrated, Internet-available channel data and metadata 102, content server 104, guide data 106 and link or URL data 105 may be provided. For example, Internet-available channel data and metadata 102 may include video content data and metadata available on the Internet, such as YouTube®, Hulu®, etc.

Content server 104 may include video content data and metadata provided by the content owners/providers. The data and metadata may include information such as video content title, storyline, cast, genre, rating, release date, and images. Guide data 106 may include channel information, programming information, network information, etc.

Link/URL data 105 may include pointers to the interactive content on the Internet associated with the linear content provided by the content owners or content providers. In case of a managed service, since the device is managed by the service provider, the association of the interactive content to the linear video may be based on time, which may be triggered at a specific point of time in the linear video, based on content (additional content available or video content being played), and/or may be based on actions such as when the user switches to a particular video content. In case of an unmanaged device where the user may be using an unmanaged CE device which may be independent from the service provider and may provide content from various content providers/owners who may include one or more of cable service providers, Internet content providers, etc.

According to an embodiment, the rendered hybrid experience may be presented according to a variety of display configurations, including scaling the "being viewed" video content in a video viewer inside the provided Internet-based content. The content may be managed by the content provider based on the content provider's business agreements with content owners, CE device manufacturers/managers, third party advertisers, the user, etc.

The Internet-available channel data and metadata 102, content server 104, guide data 106, and link or URL data 105 may be provided to a server 120 where a data mining engine 122 may be operable to analyze and sort the data and metadata, associated link or URL data and metadata 105, and associate the channel data and metadata 102, with the guide data 106. The link or URL data 105 may be hidden or may be displayed to the user. The associated channel/guide data may be cached. The cache 124 is illustrated in FIG. 1 as a remote element, but may be integrated with the server 120 or the client application 108. As new information becomes available, the associated channel/guide data may be updated in the cache 124.

According to one embodiment, the cached associated channel/guide data may be specific to a user profile. The system 100 may include a data services system 126 which may comprise such information as billing data, permissions and authorization data, user profile data, etc., and its data may be stored in a user database 125. The data services system 126 may be accessed by the data mining engine 122 for checking permissions, subscriptions, and profile data for associating channel and guide data to specific users.

As illustrated in FIG. 1, various endpoint devices may be utilized to access video content, for example, endpoint devices may include, but are not limited to, a mobile communication device 110, such as a mobile phone, a computing device 112, such as a desktop computer, a laptop computer, etc., a wireless computing device, such as a tablet computing device 114, a smart TV 113, a television 116, such as an Internet-connected television or a television connected to a network-connected device, such as a set top box (STB) 118 or an unmanaged CE device 119. An endpoint device 110,112,114,116 may be utilized to access a client application 108. As can be appreciated, a smart television, which may have the properties of an unmanaged CE device integrated within itself, may also be utilized to access the client application 108.

The client application 108 may be operable to receive a request for a video content item from a user, access the associated link or URL data 105, insert an associated link or URL website address within the video content item via a variety of mechanisms, (e.g., encrypting the link or URL within the video content item) that can be displayed and rendered on the user's display device.

According to an embodiment, a secondary screen companion device such as a tablet with an associated content provision application may also be used to allow the request of the interactive experience on the display screen such as the television 116. Other suitable means for interacting with and controlling available and received content includes touch command, voice command, gesture command and combinations of various functionality interface methods and systems.

As will be described further below, according to an embodiment, management of the unmanaged devices/services may be provided. For example if the user's cable service provider is inserting URLs/links within the content that it is providing, via a third party unmanaged device, then the links or URLs that have been inserted by a service provider cannot be removed or over-ridden as the content is being displayed on the user's display device.

According to an embodiment, the service provider can assign different links or URLs to the video content using filtering mechanisms depending on the various factors such as, CE manufacturer/manager, CE device, channel to which the video content item belongs, requested video content, user's display device, user's profile data, etc. As can be appreciated, this filtering may done with different combinations wherein different factors may be at different levels in a hierarchy when implementing the filtering mechanisms. For example, if the channel information may not be available for the requested content item, identification of the link or URL may be performed based on the next hierarchy level, where a different factor may be analyzed.

According to another embodiment, an application residing on the user's display device may have the functionality to communicate a user profile data and display device data to the server which may in turn trigger the assignment and insertion of additional links or URLs associated with the content based on the CE device used to access the services. As can be appreciated the links or URLs may be targeted on a per user basis based on the content gathered from the recommendation engine that may be deployed by the service provider that may include user preferences within the user profile data.

According to yet another embodiment, based on business rules and business agreements among service providers, device manufacturers/managers and/or users, instead of the content provider, the CE manufacturer/manager may also insert links or URLs with the video content that they may be delivering through their CE devices on the user's display device so as to provide value and enhanced viewing experience of the video content to the users. If there is an agreement between the CE manager and the service provider, the CE manager may provide links or URLs with additional content to the service provider for the service provider to associate them with a video stream and send it to the display device.

Figure 2:
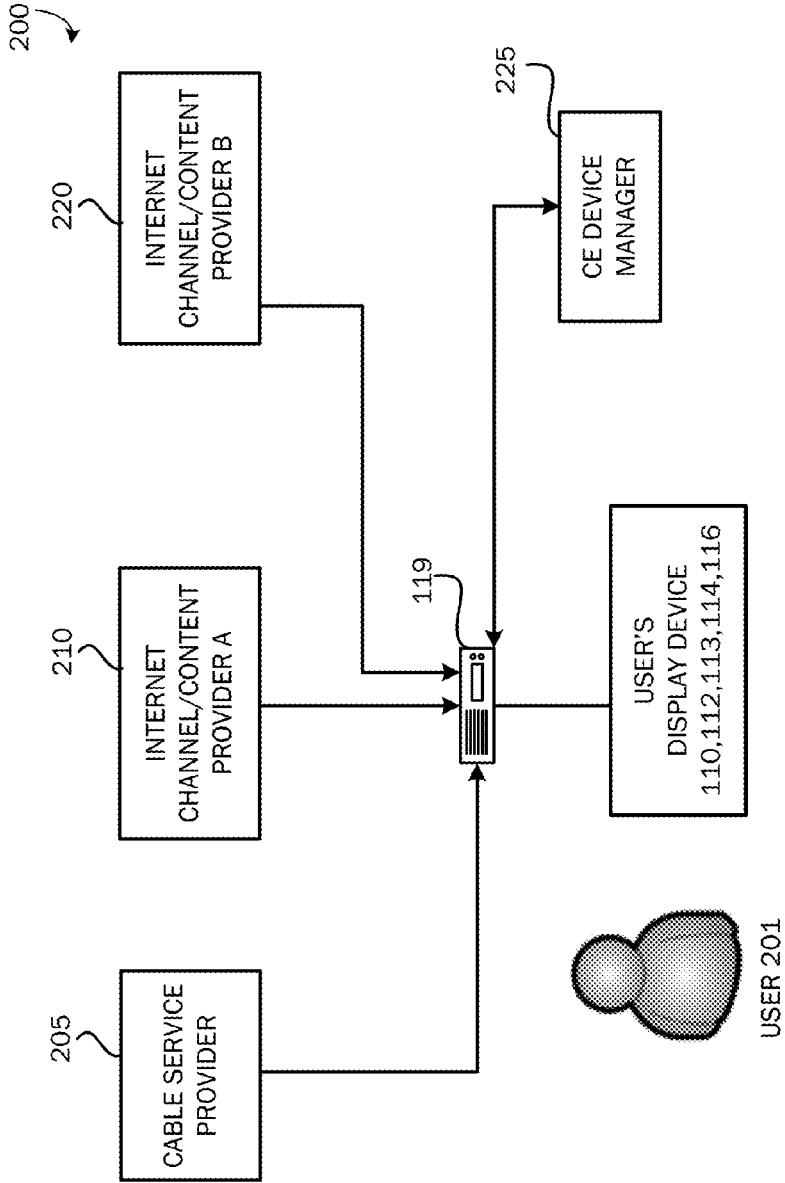
FIG. 2 is a simplified block diagram of an example for providing assignment and insertion of a link or URL in a video content item per device/user, according to an embodiment.

FIG. 2 is a block diagram illustrating an example system 200 architecture providing an operating environment according to an embodiment. A user 201 may be using a display device such as television (TV) 116, connected to an unmanaged CE device 119, or a device 110, 112, 113, 114 which may have an independent third party application for accessing the content. There may be various content providers providing content via the CE device 119. The user may be subscribed to television services through a service provider 205. The user may also be subscribed to Internet channel/content providers 210 and 220, who may provide content over the Internet for a periodic (e.g., monthly) fee, pay-per-view fee or via other payment setting. In this example, it may be noted that the example cable service provider 205 may offer content via the CE device 119 through a variety of different technologies, such as via a CableCARD. Embodiments provide for the service providers 205,210,220 to be able to manage the content being delivered onto the user's display device such that the links or URLs that may be inserted into the content stream may be presented to the user without any control from the CE device manager 225. As can be appreciated, according to embodiments, the CE device manager 225 may provide the links or URLs to the content provider/service providers 205, 210, 220 as part of a business arrangement if the CE device manager 225 desires to present additional content on the user's display device.

Figure 3A:
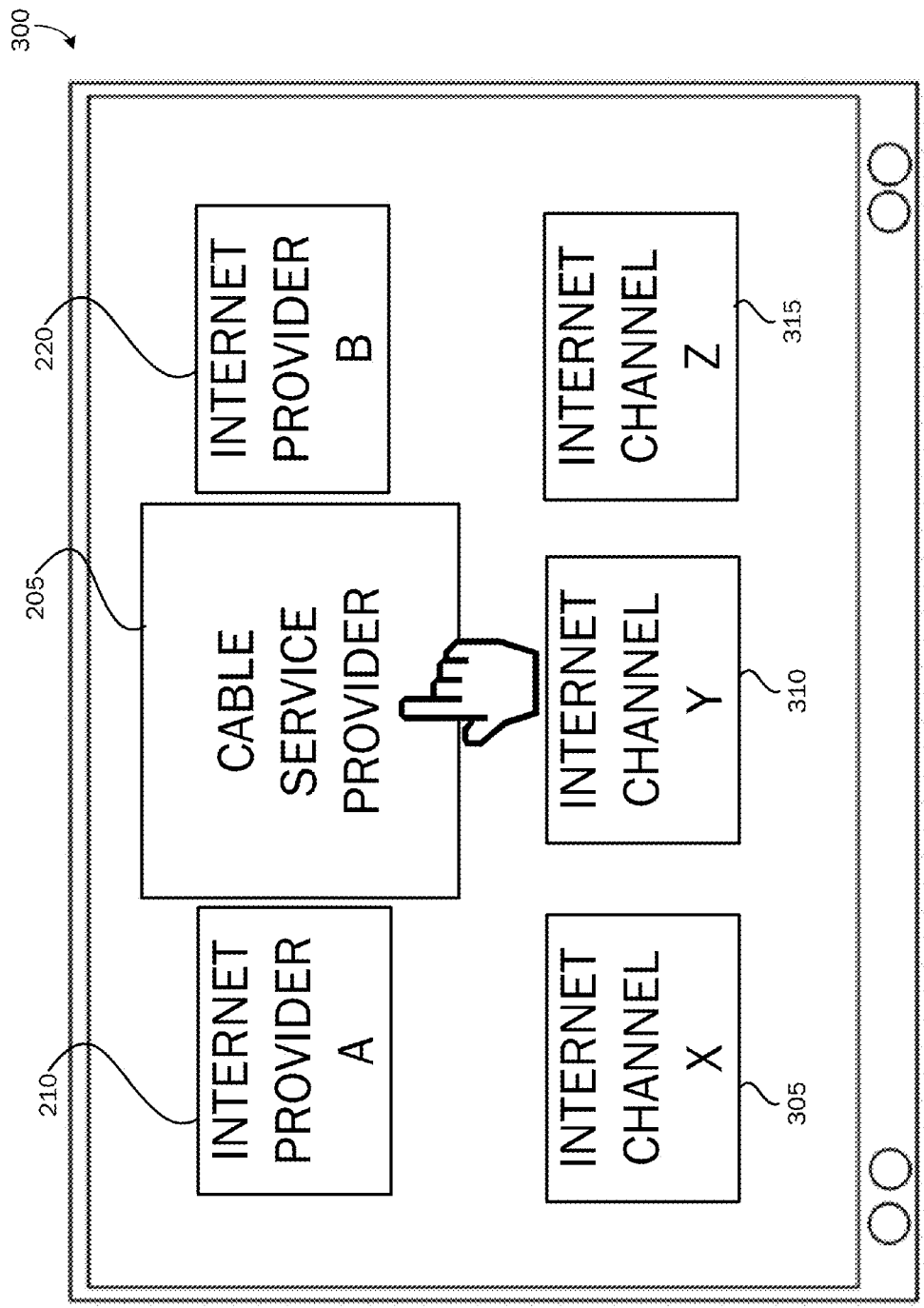
FIG. 3A is an illustration of a user interface with which a user may select a service provider from a list of service providers that may be available on the user's CE device through which he/she may select a video content, according to an embodiment.

FIG. 3A is an illustration of a user interface 300 with which a user may select a service provider from a list of service providers that may be available on the user's CE device through which he/she may select a video content, according to an embodiment. The user interface 300 illustrates an initial home screen of the CE device from where the user may be able to select a service provider that he may be subscribed to such as a cable service provider 205, a satellite TV provider, or an Internet content/channel provider 210, 220,305,310,315. For example, as illustrated in FIG. 3A, when the user points to the cable service provider 205, then that selection may be highlighted and the user may select it to view a home screen from his/her service provider's such as guide or the like. As can be appreciated, the selection may be made via a variety of data inputs, such keyboard input, remote control input, mouse input, touch input, gesture input, voice input, eye tracking input, etc. Further, the icons 210, 220, 305, 310, 315 may be selected, to view content from the Internet provider A, Internet provider B, Internet channel X, Internet channel Y and Internet channel Z respectively.

FIG. 3B is an illustration of a user interface 350 wherein a user may search for a particular video content item available via one or more service providers, according to an embodiment. A user may use the on-screen keypad 355 (or other suitable input means as set out above) to enter the name/title of the video content item in the search field 357 to search for that specific video content item across all the available providers. A list 356 with the search results with the available providers or Internet channels through which the video content may be obtained may be presented to the user's viewing device. The user may select to view the video content item via any of the listed providers or Internet channels. The links or URLs that may be attached to the video content item may be different depending on which provider may be chosen by the user to view the video content item.

Figure 3C:
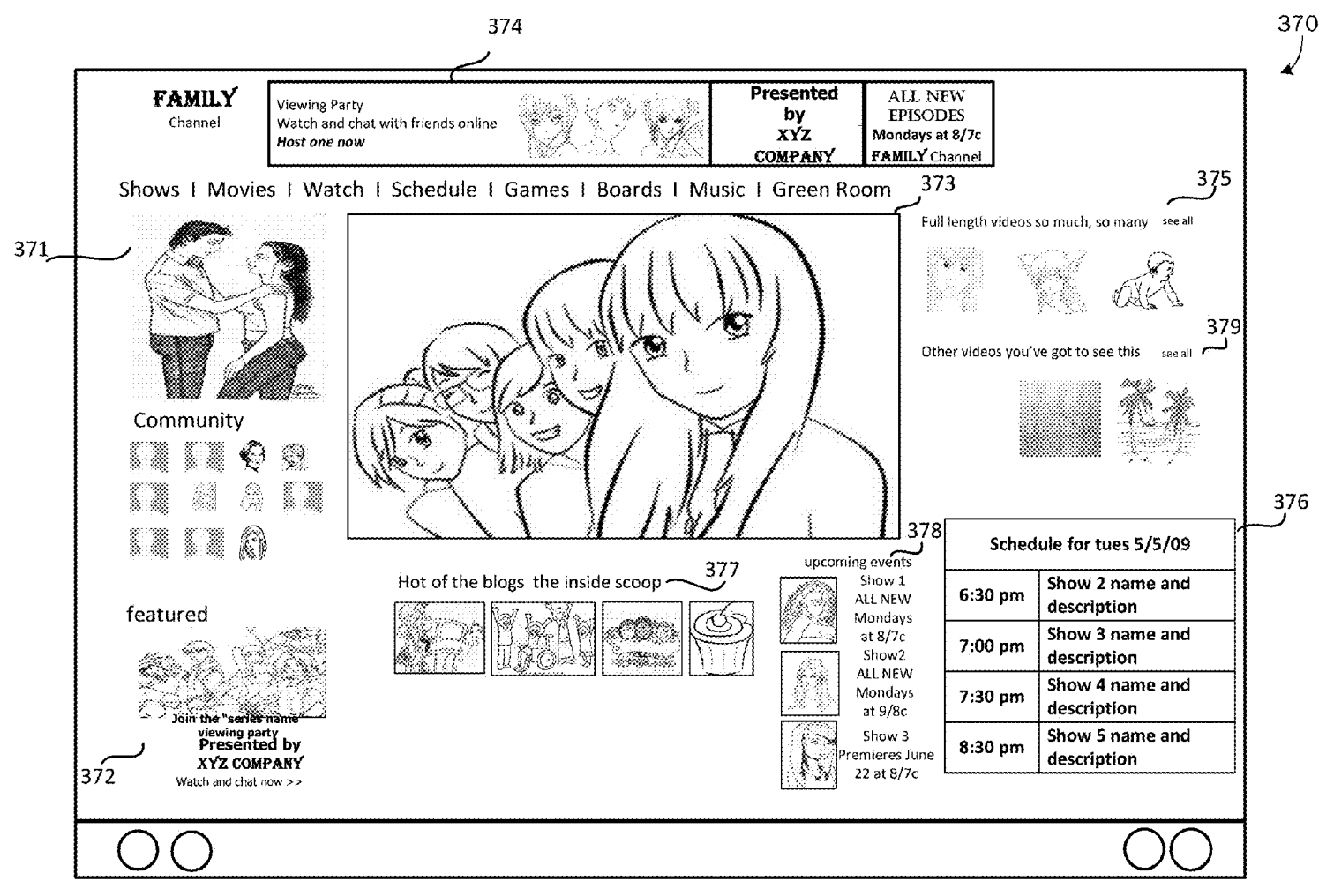

FIG. 3C is an illustration of a hybrid user interface 370 with video content and additional content presented simultaneously, according to an embodiment. As should be appreciated, the hybrid interactive video experience illustrated in FIG. 3C is for purposes of example and is not exhaustive of the vast number of layouts that may be provided. For example, as illustrated in FIG. 3C, the display screen may be presented as an instance of a browser-type display, where a variety of content items may be displayed in various locations, and the linear video 373 may be presented in a minimized embedded player with other additional content wrapped around it. According to an embodiment, additional content items may also be presented in one or more mosaic-type tiles that may be presented on a display screen with a display of the linear video being reduced accordingly. A secondary screen companion device such as a tablet may also be used to provide the additional content.

The additional content provided via the link or URL may comprise any number of Internet-based content items, for example, a social website 371 for an associated television show with real-time feeds, cast profiles, messaging, etc. Other content items may include featured upcoming event information 372, various other sponsored shows previews 377, links to upcoming shows 378, program guides 376, links to other full length videos 375 and other videos 379 (based on the user profiles and tastes, third party sponsorships, etc.), as well as, advertisements 374 or other useful or helpful information. All of the additional content illustrated in FIG. 3C may be navigable based on predetermined business rules of content providers.

Figure 4:
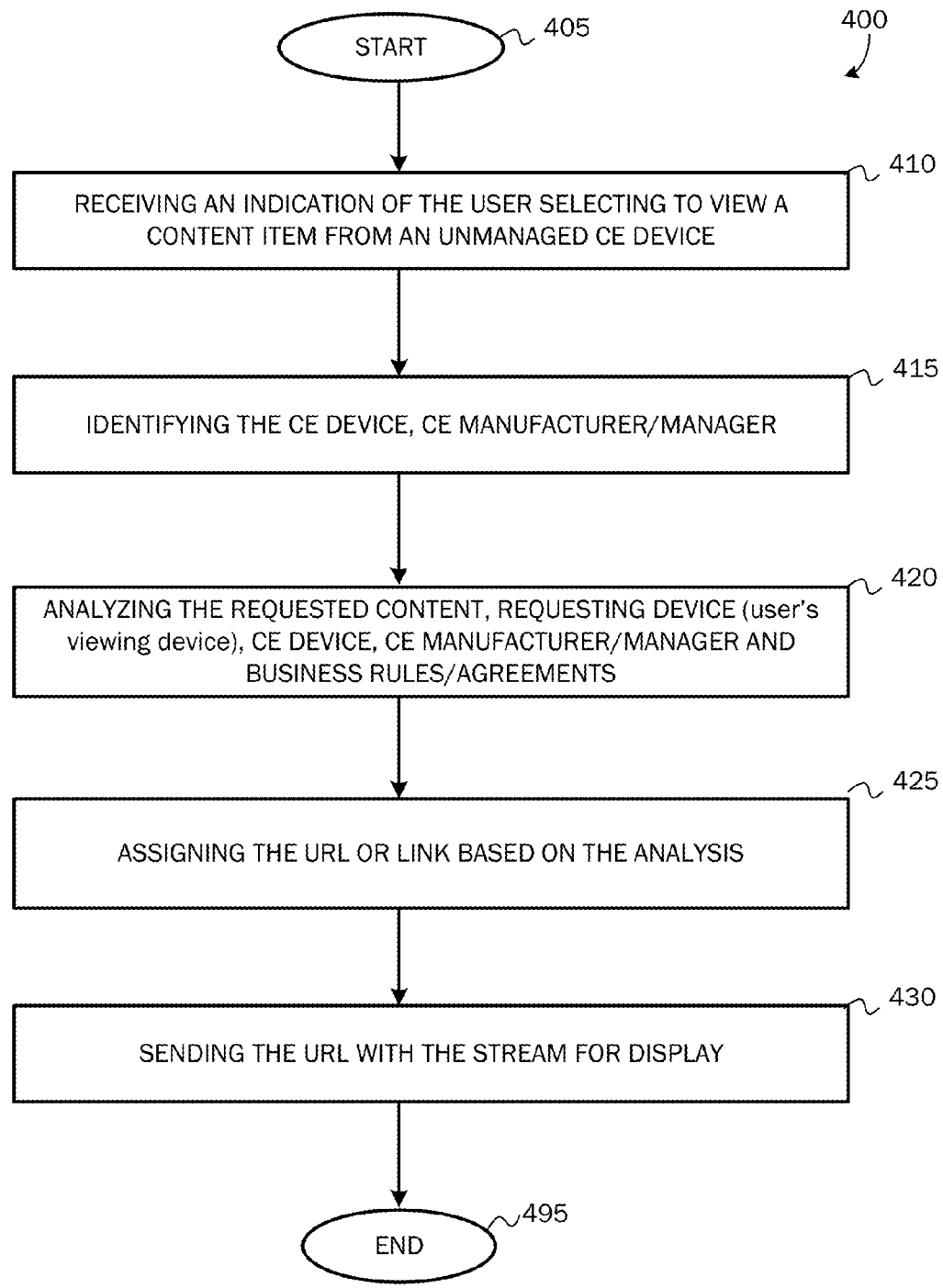
FIG. 4 is a flow chart of a method for providing assignment and insertion of a link or URL in a video content item per device/user, according to an embodiment.

FIG. 4 is a flow chart of a method for providing assignment and insertion of a link or URL in a video content item per device/user, according to an embodiment. The method 400 starts at OPERATION 405 and proceeds to OPERATION 410, where an indication may be received by a service provider/content provider that the user has selected to view a content item from an unmanaged CE device. As described above, the unmanaged CE device may be a stand-alone device or may be integrated within the user's viewing device as an application. The method 400 may then proceeds to OPERATION 415 where the CE device and CE device manufacturer/manager may be identified.

The method 400 then proceeds to OPERATION 420 where analysis may be performed based the requested content, requesting device, CE device, CE device manufacturer/manager, business rules/agreements between the service provider and the CE device manufacturer/manager, etc. to identify a URL or link that may be attached to the video content stream.

As mentioned above, embodiments may provide for different links or URLs to be identified and assigned using filtering mechanisms. These filtering mechanisms may analyze the various factors such as, CE manufacturer/manager, CE device, channel to which the video content item belongs, requested video content, user's display device, user's profile data etc. As can be appreciated, this filtering may done with different combinations wherein different factors may be utilized at different levels in a filtering hierarchy. For example, if the channel information is not available for the requested content item, identification of the link or URL may be performed based on the next hierarchy level, where a different factor (for example, a user profile) may be analyzed.

Once the link or URL or link is identified, the method 400 proceeds to OPERATION 425 where the identified URL or link is assigned and associated with the video content stream for presenting on the user's display device at OPERATION 430. The method 400 end at OPERATION 495.

Figure 5:
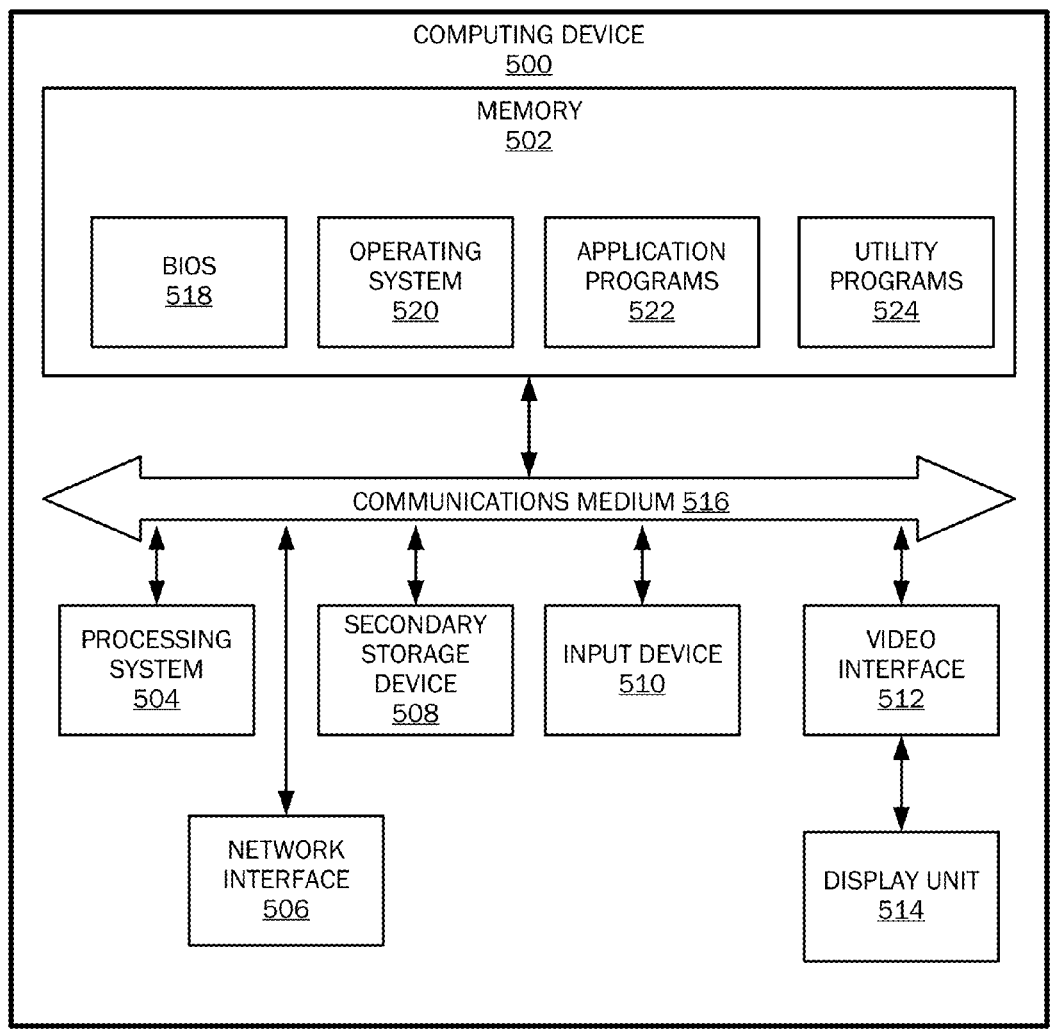
FIG. 5 is a block diagram illustrating example physical components of a computing device with which embodiments may be practiced.

FIG. 5 is a block diagram illustrating example physical components of a computing device 500 with which embodiments may be practiced. In some embodiments, one or a combination of the components of the system 100 may be implemented using one or more computing devices like the computing device 500. It should be appreciated that in other embodiments, one or a combination of the components of the system 100 may be implemented using computing devices having hardware components other than those illustrated in the example of FIG. 5.

Computing devices may be implemented in different ways in different embodiments. For instance, in the example of FIG. 5, the computing device includes a processing system 504, memory 502, a network interface 506, a secondary storage device 508, an input device 510, a video interface 512, and a display unit 514. In other embodiments, the computing device 500 may be implemented using more or fewer hardware components (e.g., a video interface, a display unit, or an input device) or in combination with other types of computer systems and program modules. The memory 502 includes one or more computer-readable storage media capable of storing data and/or computer-executable instructions. Memory 502 thus may store the computer-executable instructions that, when executed by processing system 504, provide creation of one or more channel(s) or guide with trending content items from the user's associated social network(s) as described above with reference to FIGS. 1-4.

In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media includes information delivery media. Computer-executable instructions, data structures, program modules may be embodied on a communications medium. For example, communication media can include wired media, such as a wired network or direct-wired connection, and wireless media, such as acoustic, radio frequency (RF), infrared, and other wireless media.

The term computer-readable storage medium refers only to devices and articles of manufacture that store data and/or computer-executable instructions readable by a computing device. Computer-readable storage medium do not include communications media. The term computer-readable storage media encompasses volatile and nonvolatile and removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more Intel Core microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface 506. In different embodiments, the network interface 506 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be a an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs 522 that, when executed by the processing system 504, cause the computing device 500 to provide applications to users. The memory 502 also stores one or more utility programs 524 that, when executed by the processing system 504, cause the computing device 500 to provide utilities to other software programs. Embodiments of the present invention may be utilized in various distributed computing environments where tasks are performed by remote processing devices that are linked through a communications network in a distributed computing environment.

Figure 6:
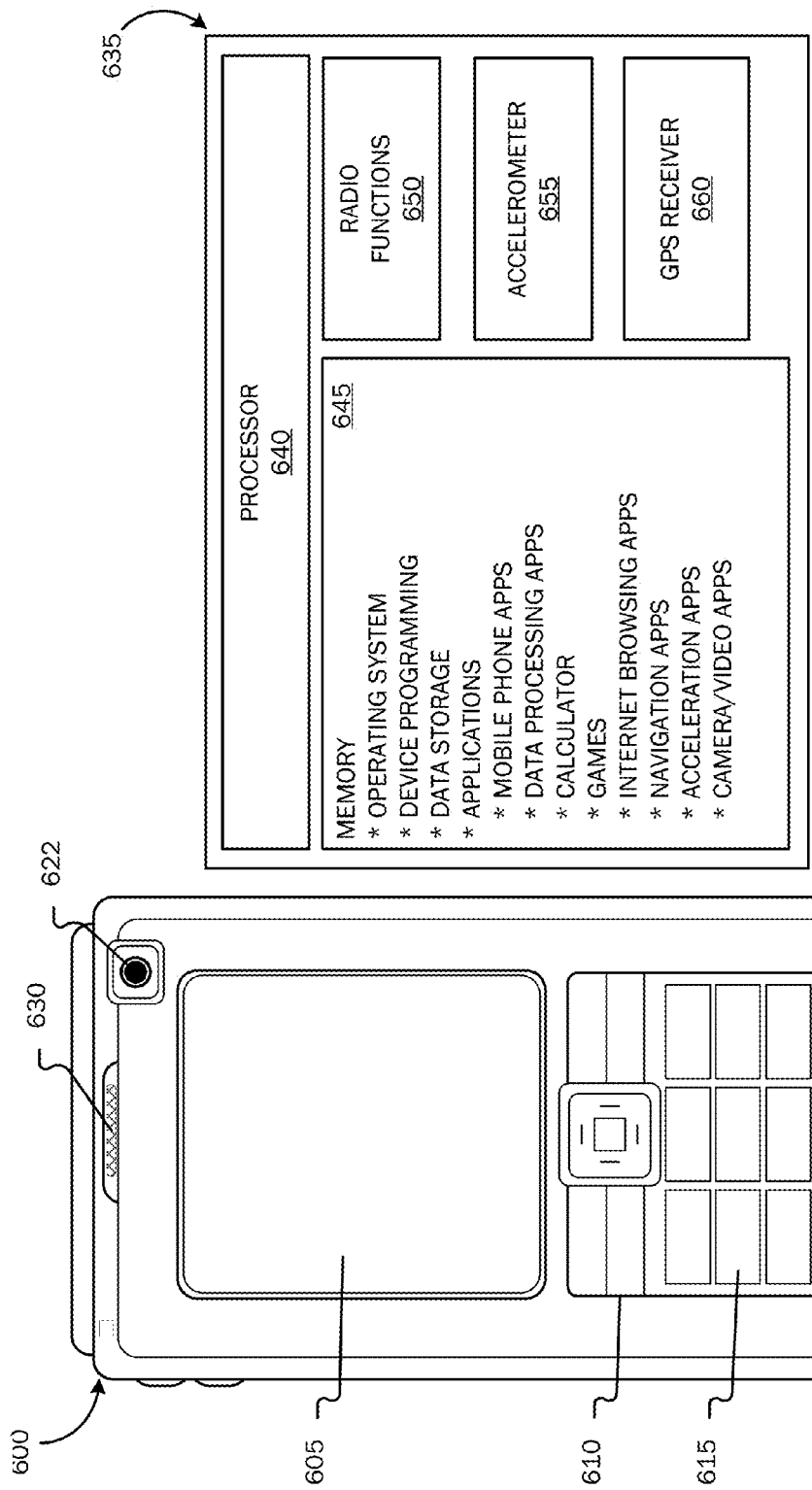
FIGS. 6A-6B illustrate a suitable mobile computing environment with which embodiments may be practiced.

FIGS. 6A-6B illustrate a suitable mobile computing environment, for example, a mobile computing device 600, a mobile phone/smartphone, a tablet device, a laptop computer, and the like, with which embodiments may be practiced. The mobile computing device 600 is illustrative of any suitable device operative to send, receive and process wireless communications according to embodiments of the present invention. A display screen 605 is operative for displaying a variety of information such as information about incoming and outgoing communications, as well as, a variety of data and displayable objects, for example, text, alphanumeric data, photographs, and the like.

Data input to the mobile computing device 600 may be performed via a variety of suitable means, such as, touch screen input via the display screen 605, keyboard or keypad input via a data entry area 610, key input via one or more selectable buttons or controls 615, voice input via a microphone 618 disposed on the mobile computing device 600, photographic input via a camera 622 functionality associated with the mobile computing device, or any other suitable input means. Data may be output via the mobile computing device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a general purpose computer processor for processing incoming and outgoing data and communications and controlling operation of the device and associated software applications via a mobile computing device operating system. Memory 645 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, application software to analyze wireless set-top box pairing and quality of service user interface may be stored locally on mobile computing device 600.

Mobile computing device 600 may contain an accelerometer 655 for detecting acceleration, and can be used to sense orientation, vibration, and/or shock. Mobile computing device 600 may contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the mobile computing device 600 to communicate with other communication devices and systems via a wireless network. Radio functions 650 may be utilized to communicate with a wireless or Wi-Fi based positioning system to determine a device's 600 location.

Figure 7:
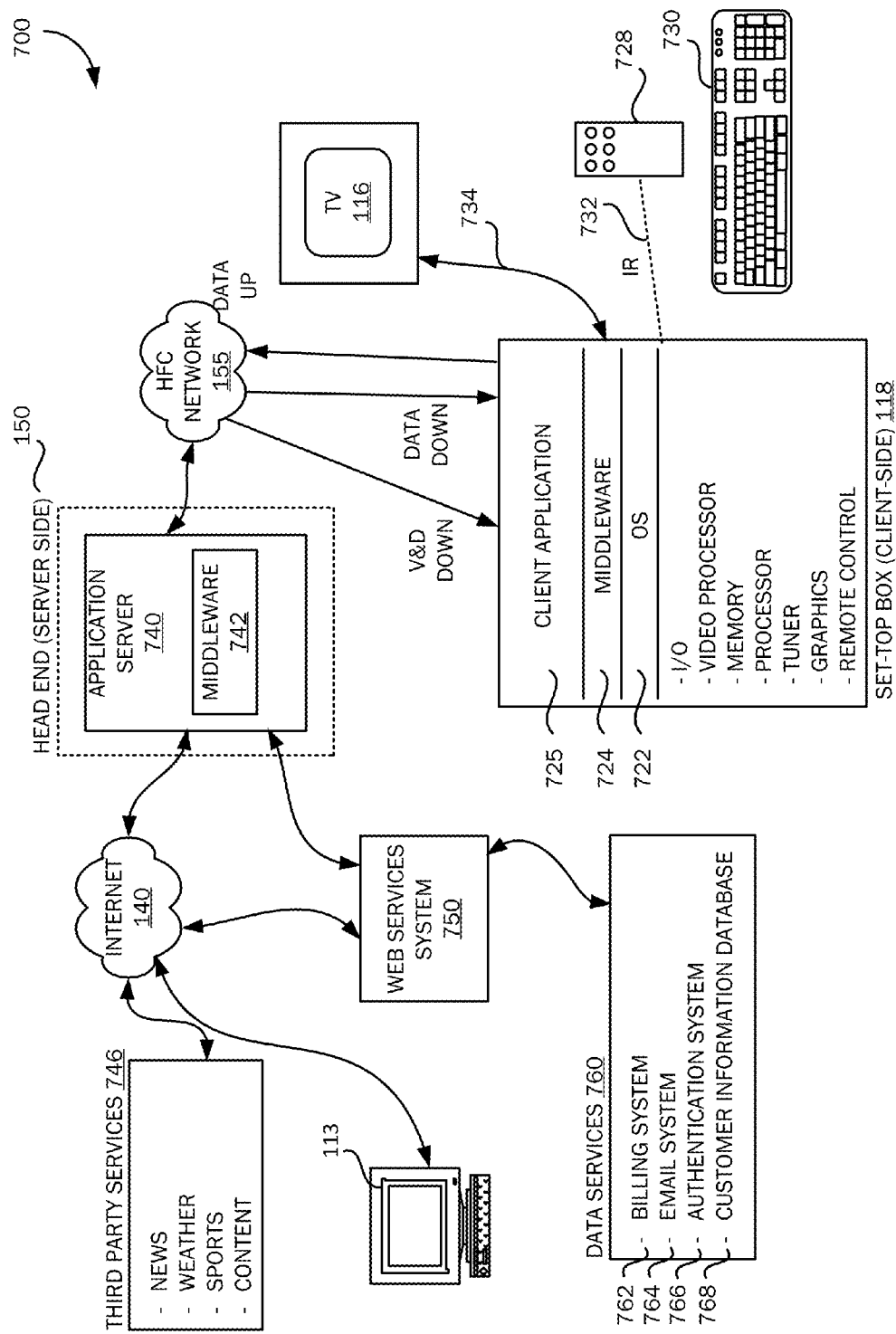
FIG. 7 is a simplified block diagram illustrating a cable television services system architecture providing an operating environment according to an embodiment.

FIG. 7 is a simplified block diagram illustrating a cable television services system 700 (hereafter referred to as "CATV") architecture providing an operating environment according to an embodiment. As can be appreciated, a CATV architecture is but one of various types of systems that may be utilized to provide substituted VOD content. Referring now to FIG. 7, digital and analog video programming, information content and interactive television services are provided via a hybrid fiber coax (HFC) network 155 to a television set 116 for consumption by a cable television/services system customer. As is known to those skilled in the art, HFC networks 155 combine both optical fiber and coaxial cable lines. Typically, optical fiber runs from the cable head end 150 to neighborhoods of subscribers. Coaxial cable runs from the optical fiber feeders to each customer or subscriber. The functionality of the HFC network 155 allows for efficient bidirectional data flow between the client-side set-top box 118 and a server-side application server 740.

The CATV system 700 is in the form of a distributed client-server computing system for providing video and data flow across the HFC network 155 between server-side services providers (e.g., cable television/services providers) via a server-side head end 150 and a client-side customer via a client-side set-top box (STB) 118 in communication with a customer receiving device, such as the television set 116. As is understood by those skilled in the art, modern CATV systems 700 may provide a variety of services across the HFC network 155 including traditional digital and analog video programming, telephone services, high speed Internet access, video-on-demand, and information services.

On the client side of the CATV system 700, digital and analog video programming and digital and analog data are provided to the customer television set 116 via the set-top box (STB) 118. Interactive television services that allow a customer to input data to the CATV system 700 likewise are provided by the STB 118. As illustrated in FIG. 7, the STB 118 is a multipurpose computing device having a computer processor, memory, and an input/output mechanism. The input/output mechanism receives input from server-side processes via the HFC network 155 and from customers via input devices such as the remote control device 728, keyboard 730, or other computing device, such as a tablet/slate computer 114, mobile computing device 600, etc. The remote control device 728 and the keyboard 730 may communicate with the STB 118 via a suitable communication transport such as the infrared connection 732. The STB 118 also includes a video processor for processing and providing digital and analog video signaling to the television set 116 via a cable communication transport 734. A multi-channel tuner is provided for processing video and data to and from the STB 118 and the server-side head end system 150, described below.

The STB 118 also includes an operating system 722 for directing the functions of the STB 118 in conjunction with a variety of client applications 725. For example, if a client application 725 requires a news flash from a third-party news source to be displayed on the television set 116, the operating system 722 may cause the graphics functionality and video processor of the STB 118, for example, to output the news flash to the television set 116 at the direction of the client application 725 responsible for displaying news items.

Because a variety of different operating systems 722 may be utilized by a variety of different brands and types of set-top boxes, a middleware layer 724 may be provided to allow a given software application to be executed by a variety of different operating systems. According to an embodiment, the middleware layer 724 may include a set of application programming interfaces (APIs) that are exposed to client applications 725 and operating systems 722 that allow the client applications to communicate with the operating systems through common data calls understood via the API set. As described below, a corresponding middleware layer is included on the server side of the CATV system 700 for facilitating communication between the server-side application server and the client-side STB 118. The middleware layer 742 of the server-side application server and the middleware layer 724 of the client-side STB 118 may format data passed between the client side and server side according to the Extensible Markup Language (XML).

According to one embodiment, the set-top box 118 passes digital and analog video and data signaling to the television set 116 via a one-way communication transport 734. According to other embodiments, two-way communication transports may be utilized, for example, via high definition multimedia (HDMI) ports. The STB 118 may receive video and data from the server side of the CATV system 700 via the HFC network 155 through a video/data downlink and data via a data downlink. The STB 118 may transmit data from the client side of the CATV system 700 to the server side of the CATV system 700 via the HFC network 155 via one data uplink. The video/data downlink is an "in band" downlink that allows for digital and analog video and data signaling from the server side of the CATV system 700 through the HFC network 155 to the set-top box 118 for use by the STB 118 and for distribution to the television set 116. As is understood by those skilled in the art, the "in band" signaling space operates at a relative high frequency, e.g., between 54 and 400 megahertz. The signaling space is generally divided into 6 megahertz channels in which may be transmitted as a single analog signal or a greater number (e.g., ten) of digital signals.

The data downlink and the data uplink, illustrated in FIG. 7, between the HFC network 155 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 740 is typically passed through the "out of band" data links. Alternatively, an "in band" data carousel may be positioned in an "in band" channel into which a data feed may be processed from the server-side application server 740 through the HFC network 155 to the client-side STB 118. Operation of data transport between components of the CATV system 700, described with reference to FIG. 7, is well known to those skilled in the art.

Referring still to FIG. 7, the head end 150 of the CATV system 700 is positioned on the server side of the CATV system and includes hardware and software systems responsible for originating and managing content for distributing through the HFC network 155 to client-side STBs 118 for presentation to customers via television sets 116. As described above, a number of services may be provided by the CATV system 700, including digital and analog video programming, interactive television services, telephone services, video-on-demand services, targeted advertising, and provision of information content.

The application server 740 is a general-purpose computing system operative to assemble and manage data sent to and received from the client-side set-top box 118 via the HFC network 155. As described above with reference to the set-top box 118, the application server 740 includes a middleware layer 742 for processing and preparing data from the head end of the CATV system 700 for receipt and use by the client-side set-top box 118. For example, the application server 740 via the middleware layer 742 may obtain data from third-party services 746 via the Internet 140 for transmitting to a customer through the HFC network 155 and the set-top box 118. For example, content metadata of a third-party content provider service may be downloaded by the application server 740 via the Internet 140. When the application server 740 receives the downloaded content metadata, the middleware layer 742 may be utilized to format the content metadata for receipt and use by the set-top box 118. Therefore, content metadata may be sent and categorized based on the availability to the customer's program guide data.

According to one embodiment, data obtained and managed by the middleware layer 742 of the application server 740 is formatted according to the Extensible Markup Language and is passed to the set-top box 118 through the HFC network 155 where the XML-formatted data may be utilized by a client application 725 in concert with the middleware layer 724, as described above. As should be appreciated by those skilled in the art, a variety of third-party services data, including news data, weather data, sports data and other information content may be obtained by the application server 740 via distributed computing environments such as the Internet 140 for provision to customers via the HFC network 155 and the set-top box 118.

According to embodiments, the application server 740 obtains customer support services data, including billing data, information on customer work order status, answers to frequently asked questions, services provider contact information, and the like from data services 760 for provision to the customer via an interactive television session. As illustrated in FIG. 7, the services provider data services 760 include a number of services operated by the services provider of the CATV system 700 which may include data on a given customer.

A smart television (TV) 113 is illustrated for communicating with other components of the system 700 via the Internet 140. For example, the smart TV 113 may include functionality for receiving and displaying content from the system 700 via Internet protocol through the Internet 140.

A billing system 762 may include information such as a customer's name, street address, business identification number, Social Security number, credit history, and information regarding services and products subscribed to by the customer. According to embodiments, the billing system 762 may also include billing data for services and products subscribed to by the customer for bill processing, billing presentment and payment receipt.

A customer information database 768 may include general information about customers such as place of employment, business address, business telephone number, and demographic information such as age, gender, educational level, and the like. The customer information database 768 may also include information on pending work orders for services or products ordered by the customer. The customer information database 768 may also include general customer information such as answers to frequently asked customer questions and contact information for various service provider offices/departments. As should be understood, this information may be stored in a variety of disparate databases operated by the cable services provider.

Referring still to FIG. 7, web services system 750 is illustrated between the application server 740 and the data services 760. According to embodiments, web services system 750 serves as a collection point for data requested from each of the disparate data services systems comprising the data services 760. According to embodiments, when the application server 740 requires customer services data from one or more of the data services 760, the application server 740 passes a data query to the web services system 750. The web services system formulates a data query to each of the available data services systems for obtaining any required data for a requesting customer as identified by a set-top box identification associated with the customer. The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above.

An authentication system 766 may include information such as secure user names, subscriber profiles, subscriber IDs, and passwords utilized by customers for access to network services. As should be understood by those skilled in the art, the disparate systems 762, 764, 766, 768 may be integrated or provided in any combination of separate systems, wherein FIG. 7 shows only one example.

Embodiments of the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-7. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method for associating a content link with a provided video content item on per device basis; the method comprising:

performing, via a mining engine, analysis to determine whether an electronic device has an ability to update links and to identify a link for an additional content item, wherein the electronic device is unmanaged such that the electronic device is independent of a service provider for accessing content items from the service provider;

based on the mining engine's analysis of the electronic device, a server associating the link for the additional content item within a provided video content item;

receiving, from the server, the provided video content item at the electronic device with which the provided video content item may be presented;

simultaneously presenting, on the same electronic device, the linked additional content item and the provided video content item wherein the provided video content item is presented in accordance with a location in the provided video content item corresponding to the associated link, and receiving an indication via the electronic device for navigating the additional content item while the provided video content item from the server remains presented on the electronic device for viewing.

2. The method of claim 1, wherein associating a link for an additional content item in the provided video content item includes inserting the link in a metadata associated with the provided video content item.

3. The method of claim 1, wherein associating the link for an additional content item in the provided video content item includes inserting a uniform resource locator into the provided video content item for allowing navigation to the linked additional content item at a location associated with the uniform resource locator for providing the linked additional content item in association with the provided video content item.

4. The method of claim 3, wherein inserting a uniform resource locator for allowing navigation to the linked additional content item includes inserting an encrypted uniform resource locator.

5. The method of claim 3, wherein presenting the linked additional content item during the presentation of the video content item in accordance with a location in the provided video content item corresponding to the associated link includes presenting the linked additional content via an Internet-based browsing function enabled on the electronic device.

6. The method of claim 1, wherein associating a link for an additional content item in the provided video content item includes inserting the link associated with the provided video content item according to the electronic device at which the provided video content item is received, wherein a different link is inserted in the metadata associated with the provided video content item if the provided content item is passed to a different electronic device.

7. The method of claim 6, wherein the different link is associated with the provided video content item if the provided content item is passed to a different electronic device if the different electronic device is manufactured by a manufacturer other than a manufacturer of the electronic device.

8. The method of claim 6, wherein the different link is associated with the provided video content item if the provided video content item is passed to a different electronic device if the different electronic device is serviced by a service provider other than the service provider associated with the electronic device.

9. The method of claim 1, wherein associating a link for an additional content item in the provided video content item includes associating the link with the additional content item based on at least one of:
the service provider associated with the electronic device;
a type of the electronic device;
a service provider for the provided video content item;
a presentation channel associated with provided video content item;
a user of the electronic device;
a viewing profile associated with the user of the electronic device;
one or more business rules; and
one or more agreements between the service provider for the provided video content item and the service provider associated with the electronic device.

10. The method of claim 2, wherein the link to the additional content item may be modified or deleted by a manufacturer or the service provider associated with the electronic device.

11. The method of claim 10, wherein modifying the link to the additional content item includes replacing the link to the additional content item with a link to a different additional content item.

12. The method of claim 2, wherein the link to the additional content item may not be modified or deleted by a manufacturer or service provider associated with the electronic device.

13. The method of claim 1, further comprising prior to associating a link for an additional content item in a provided video content item:
receiving a selection at the electronic device for receiving the provided video content item a the electronic device;
identifying at least one of:
a type of the electronic device;
a manufacturer of the electronic device;
a service provider associated with the electronic device; and
a user of the electronic device;
determining a linked additional content item to link to the provided video content item based on the identifying of at least one of a type of the electronic device, a manufacturer of the electronic device, a service provider associated with the electronic device, and a user of the electronic device; and
wherein associating a link with a content item in a provided video content item includes inserting a link to the determined linked additional content item in the provided video content item.

14. The method of claim 1, wherein the electronic device may comprise:
a standalone device in communication with a display device associated with a receiver of the provided video content item; or
an application integrated within a display device associated with a receiver of the provided video content item.

15. The method of claim 1, wherein presenting the linked additional content item during the presentation of the video content item in accordance with a location in the provided video content item corresponding to the associated link includes presenting the linked additional content item in a format optimized for the electronic device.

16. The method of claim 15, wherein presenting the linked additional content item during the presentation of the video content item in accordance with a location in the provided video content item corresponding to the associated link includes presenting the linked additional content item in an Internet-based website enabled by the electronic device.

17. A computer readable storage device containing computer executable instructions which when executed by a computing device perform a method for associating a content link with a provided video content item on per device basis; the method comprising:
performing, via a mining engine, analysis to determine whether an electronic device has an ability to update links and to identify a link for an additional content item, wherein the electronic device is unmanaged such that the electronic device is independent of a service provider for accessing content items from the service provider;
based on the mining engine's analysis of the electronic device, a server associating the link for the additional content item in a provided video content item;
receiving, from the server, the provided video content item at the electronic device with which the provided video content item may be presented;
simultaneously presenting, on the same electronic device, the linked additional content item and the provided video content item wherein the provided video content item is presented in accordance with a location in the provided video content item corresponding to the inserted link;
receiving an indication via the electronic device for navigating the additional content item while the provided video content item from the server remains presented on the electronic device for viewing;

associating, via the server, a different link with the provided video content item if the provided content item is passed to a different electronic device; and if a different link is associated with the provided video content item, presenting on the electronic device an additional content item associated with the different link during the presentation of the provided video content item in accordance with a location in the provided video content item corresponding to the associated different link.

18. The computer readable storage device of claim 17, wherein associating the link with the additional content item in the provided video content item includes inserting a uniform resource locator for allowing navigation to the linked additional content item at a location associated with the uniform resource locator for providing the linked additional content item in association with the provided video content item.

19. The computer readable storage device of claim 18, wherein inserting a uniform resource locator for allowing navigation to the linked additional content item includes inserting an encrypted uniform resource locator.

20. A system for associating a content link with a provided video content item on per device basis, the system comprising:

a memory storage; and a processing unit coupled to the memory storage, wherein the processing unit is operable to:

receive a selection at the given electronic device for receiving the provided video content item at the given electronic device;

identify at least one of:
  a type of the given electronic device;
  a manufacturer of the given electronic device;
  a service provider associated with the given electronic device; and
  a user of the given electronic device;

performing analysis, via a mining engine, to determine whether the given electronic device has an ability to update links when the given electronic device is unmanaged such that the electronic device is independent of a service provider for accessing content items from the service provider and to determine a linked additional content item to link to the provided video content item based on the identifying at least one of a type of the given electronic device, a manufacturer of the given electronic device, a service provider associated with the given electronic device, and a user of the given electronic device;

based on the mining engine's analysis of the given electronic device, associate via a server a link with the determined linked additional content item within the provided video content item such that the link is presented during presentation of the provided video content item;

simultaneously presenting on the same electronic device the linked additional content item and the provided video content item on the same electronic device; and receiving an indication via the electronic device for navigating the additional content item while the provided video content item from the server remains presented on the electronic device for viewing.

* * * * *